United States Patent [19]
Denis

[11] 3,919,854
[45] Nov. 18, 1975

[54] GAS SEALING ASSEMBLY

[75] Inventor: Louis H. Denis, Paris, France

[73] Assignee: Compagnie Francaise D'Etudes et de Construction Technip, Rueil-Malmaison, France

[22] Filed: Dec. 23, 1974

[21] Appl. No.: 535,819

Related U.S. Application Data
[62] Division of Ser. No. 451,367, March 14, 1974.

[30] Foreign Application Priority Data
Mar. 14, 1973 France.................. 73.9121

[52] U.S. Cl. ............... 62/37; 62/510; 62/41; 277/3; 277/15; 277/12
[51] Int. Cl.² ................................. F25J 3/00
[58] Field of Search ........ 62/498, 175, 510, 53, 21, 62/37, 41, 39, 36, 9, 6; 277/3, 15, 12, 32

[56] References Cited
UNITED STATES PATENTS

| | | | |
|---|---|---|---|
| 2,602,583 | 7/1952 | Haeberlein | 277/12 |
| 2,602,680 | 7/1953 | Church | 277/12 |
| 2,631,050 | 3/1953 | Haeberlein | 277/12 |
| 2,910,328 | 10/1959 | Frolich | 277/12 |
| 3,107,099 | 10/1963 | Hasbrouck et al. | 277/3 |
| 3,235,269 | 2/1966 | Olesen | 277/15 |
| 3,302,951 | 2/1967 | Olesen | 277/15 |
| 3,414,274 | 12/1968 | Aronson | 277/15 |
| 3,503,618 | 3/1970 | Real | 277/15 |
| 3,604,206 | 9/1971 | Baily | 277/15 |
| 3,831,381 | 8/1974 | Swearingen | 277/15 |

Primary Examiner—Norman Yudkoff
Assistant Examiner—Frank Sever
Attorney, Agent, or Firm—Flynn & Frishauf

[57] ABSTRACT

In and for a gas-handling machine, a shaft sealing assembly comprising two casings around the shaft, at a lower-pressure and at a higher-pressure side of the machine respectively. Each casing includes a first annular chamber receiving a gas to form a gas barrier around the shaft, and a second annular chamber receiving an inert gas. A third annular chamber is disposed between the first and second chambers and is held at a lower pressure than said chambers, while a fourth annular chamber is positioned at the side of the second chamber remote from the third chamber. The fourth chamber has a discharge to atmosphere at a position remote from the machine. The casing at the higher-pressure side of the machine can additionally have a fifth chamber between the first chamber and the body of the machine, for receiving some of the gas being handled by the machine. The machine can be a compressor for liquefying natural gas.

8 Claims, 2 Drawing Figures

GAS SEALING ASSEMBLY

This is a division of application Ser. No. 451,367, filed Mar. 14, 1974.

BACKGROUND OF THE INVENTION

Machines for handling gas have been proposed, for example compressors for liquefying natural gas, which have a high-pressure side and a low-pressure side, with a shaft extending through the body of the machine from the high-pressure side to the low-pressure side. This shaft may perform a rotary movement, or a sliding movement, or a combination of such movements, relative to the stationary body of the machine, for example it may be a rotary drive shaft, a sluice gate valve shaft, a distribution shaft, or the like.

It has been proposed that where such a shaft passes through the stationary body of the machine, the shaft can be sealed by using oil under pressure, and contact or floating rings. However, this arrangement can suffer from various disadvantages, for example in normal operation there is a consumption of oil which is polluted by the gas being handled. Also, in the event of a mishap, for example an abrupt change in the mode of operation of the machine, a variation in the pressure of the gas being processed, or the like, some of the pressure oil providing the sealing action can be drawn into the gas being handled, which can have serious consequences in the remainder of the circuit which is connected to the machine, for example a gas liquefaction system.

SUMMARY OF THE INVENTION

A main object of the present invention is to overcome the disadvantages of the above-referred to machines which use oil for sealing purposes.

A further object of the present invention is to provide a device for sealing a shaft where it passes through the stationary body of a machine, by using a gas having a barrier action to prevent leakage from the machine.

Another object of the present invention is to provide a gas-handling machine having a shaft which is sealed by a barrier-action gas such that any leakage to the ambient atmosphere of the barrier-action gas will not give rise to the danger of fire or explosion. The barrier-action gas should also not cause pollution of the gas being handled by the machine.

Yet another object of the invention is to provide a sealing device using gas having a barrier action, which makes it possible to recover by a closed circuit any leakage through the sealing device of the gas which is being handled by the machine, both in normal operation the gas which is being handled by the machine, both in normal operation and in the event of a hitch in operation.

To achieve the above and other objects, in a machine for processing a gas, having a high-pressure side and a low-pressure side and a shaft extending from the high-pressure to the low-pressure side, a casing is disposed on the shaft, at each of the sides of the machine, between the body of the machine, with respect to which the casing is fixed, and a shaft bearing disposed at a distance from the machine body. The casing at the high-pressure side has annular chambers which open onto the shaft, namely: a first chamber, a second chamber which is disposed between the first chamber and the bearing, a third chamber between the first and second chambers, a fourth chamber between the second chamber and the bearing, and a fifth chamber between the first chamber and the machine body.

At the low-pressure side the casing has four annular chambers similar to the arrangement of the above-mentioned first to fourth chambers at the high-pressure side, but there is no fifth chamber in the low-pressure side casing. The first four chambers of the casings at the high-pressure and low-pressure sides respectively are interconnected. When the machine is a compressor for liquefying natural gas, the fifth chamber at the high-pressure side can be connected to the intake chamber in the casing of the compressor.

The arrangement also has means for introducing into the first chambers a barrier-action gas under pressure, means for introducing an inert gas under pressure into the second chambers, gas-flow producing means such as a pump operatively associated with the third chambers for producing in the third chambers a pressure which is slightly lower than the pressure in the first and second chambers and in particular lower than atmospheric pressure, a conduit connected to the fourth chambers and opening to the atmosphere at a position remote from the casing, for the discharge of gas from the fourth chamber, and means for introducing some of the gas being handled by the machine, from the low-pressure side, into the fifth chamber of the high-pressure side casing.

When the machine is a compressor for liquefying natural gas, operatively associated with a boiler or a gas turbine producing flue or combustion gases, the means for feeding inert gas to the second chambers can comprise a smoke purification means for treating the smoke or discharge from the boiler or gas turbine, a monitoring device for monitoring the degree of purification effected by the purification means, an inert gas generator, and a nitrogen storage reservoir. If there is a deficiency in the purification of the smoke or discharge from the boiler or gas turbine, the monitoring means causes the inert gas generator and/or the nitrogen storage reservoir to output gas therefrom, for mixing with the smoke or discharge gases. The smoke or discharge gases or the mixture thereof with inert gas and/or nitrogen is displaced by a pressurizing means such as a pump into the second chambers, by way of a valve which controls the output of the pump and which is controlled by a pressure regulator in dependence on the pressures in the second and third chambers of the casings.

Advantageously, the means for introducing barrier-action gas into the first chambers of the casings comprises a valve, and a pressure regulator which controls said valve in dependence on the pressures in the first and fifth annular chambers at the high-pressure side. The barrier-action gas may comprise at least one of the gases of a group comprising fuel gas and purge gas, from the compressor. The means associated with the third annular chamber may comprise a pressurising means such as a pump, and a constant pressure regulator for controlling the pressurising means.

Thus, any leaks towards the interior of the body from the casing pass either directly from the first chamber in the case of the casing at the low-pressure side of the machine, or by way of the fifth chamber at the high-pressure side. Thus, bearing in mind the nature of the barrier-action gas, the gas being handled in the machine cannot become polluted. In addition, leakage from the first chamber towards the shaft bearing in each casing is caught by the third chamber, leakage from the second chamber towards the interior of the machine body is caught by the third chamber, and leakage of inert gas towards the bearing is caught by the fourth chamber and thus discharged by way of a discharge means at a remote position.

Means for preventing leakage such as labyrinth seals, carbon rings, toroidal seals, plastics seals and the like, can be disposed on at least one side of at least one chamber in each of the casings, around the shaft, according to considerations of choice or opportunity.

DESCRIPTION OF THE PREFERRED EMBODIMENT

Figure 1:
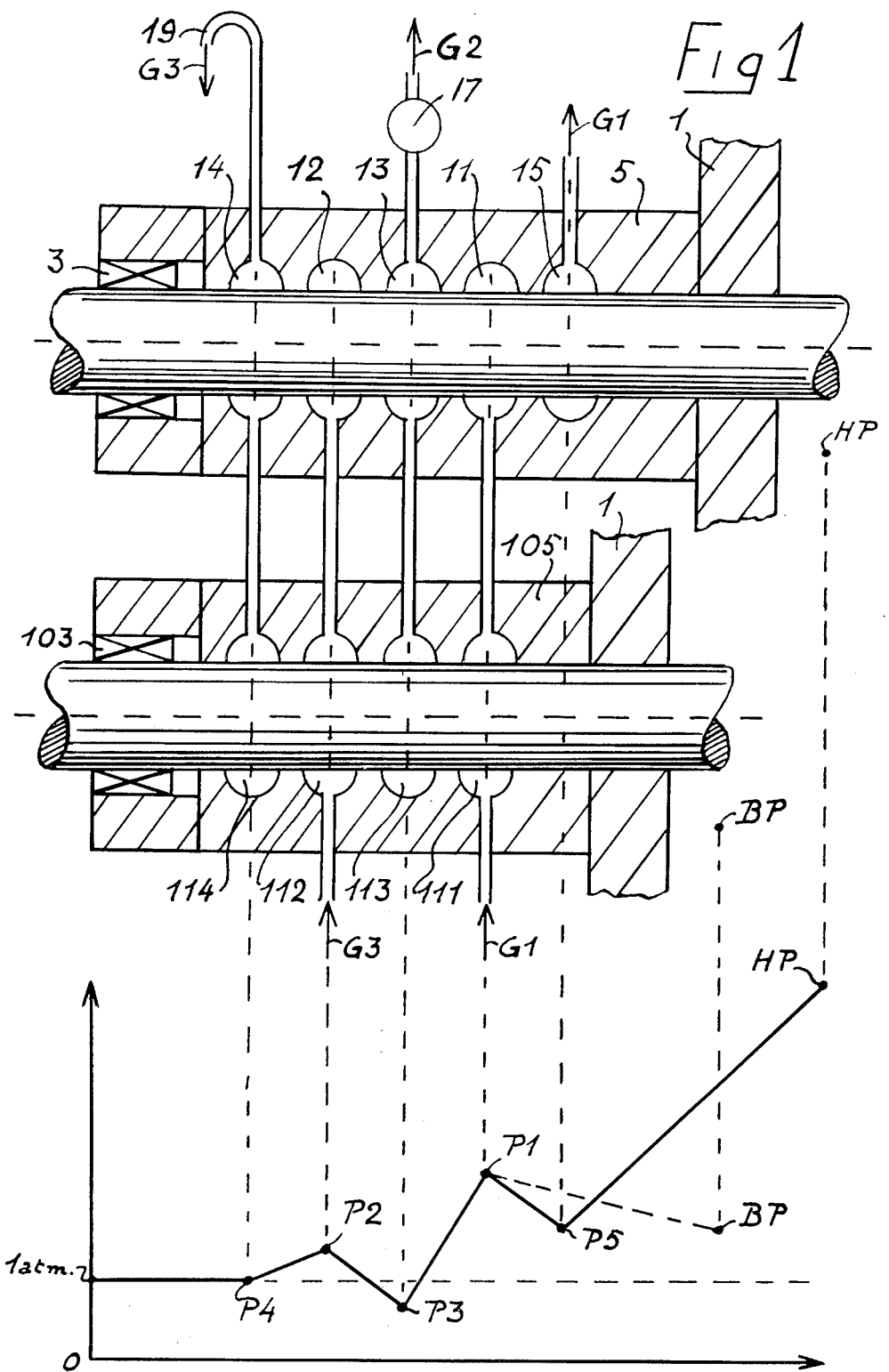
FIG. 1 is a diagrammatic view in cross-section of two arrangements forming a sealing assembly according to the invention, one (at the top of FIG. 1) for the high-pressure side and the other (in the middle of FIG. 1) for the low-pressure side, with (at the bottom of FIG. 1) a graph indicating the pressures in the chambers.

Referring to FIG. 1, a gas handling or processing machine, such as a compressor for liquefying natural gas, has a shaft 2 which extends through the body of the machine. One end of the shaft 2 extends through a stationary portion 1 of the body of the machine, and is supported by a bearing 3, at the high-pressure side of the machine, as shown at the top of FIG. 1. The other end of the shaft, at the low-pressure side, as shown in the middle part of FIG. 1, also extends through stationary portion 1 of the machine body, and similarly is supported by a bearing 103. Enclosing the shaft in its portion at the high-pressure side, between the stationary portion 1 and the bearing 3, is a casing 5 provided with five annular chambers 11 to 15 which open towards and surround the shaft 2. Similarly, a casing 105 with four annular chambers 111 to 114 encloses the shaft 2 between the portion 1 and the bearing 103.

The first chamber 11 is arranged to be fed with a barrier gas G1 from a liquefication unit via chamber 111, at a pressure P1 (see the graph at the bottom of FIG. 1). The second chamber 12 is arranged to be fed with inert gas G3 via chamber 112, at a pressure P2. The third chamber 13 is maintained at a pressure P3 which is lower than the pressures in the chambers 11 and 12, for example, as shown, slightly lower than atmospheric pressure, by a pump 17 or equivalent gas-flow producing means; the gas G2 drawn from the chamber 13 is a mixture of the gases G1 and G3, as will be apparent from this description. The fourth chamber 14 communicates with atmosphere by way of a remote discharge 19 which discharges the inert gas G3 from the chamber 14. The fifth chamber 15 is kept at a pressure P5 (see again the graph at the bottom of FIG. 1) which is lower than the high-pressure HP of the high-pressure side of the machine and the pressure P1, being for example equal to the low pressure BP of the low-pressure side. The gas drawn from the chamber 15 is the barrier gas G1.

The only difference between the sealing arrangement at the to of FIG. 1, at the high-pressure side, and the arrangement in the middle part of FIG. 1, at the low-pressure side, is that the low-pressure side arrangement does not have a fifth chamber corresponding to the chamber 15. The chambers 111 to 114 are connected to the corresponding chambers 11 to 14, as shown. The relative pressures in the various chambers, as shown by the graph at the bottom of FIG. 1, show that there is no need or utility for the low-pressure side arrangement to include a fifth chamber.

Figure 2:
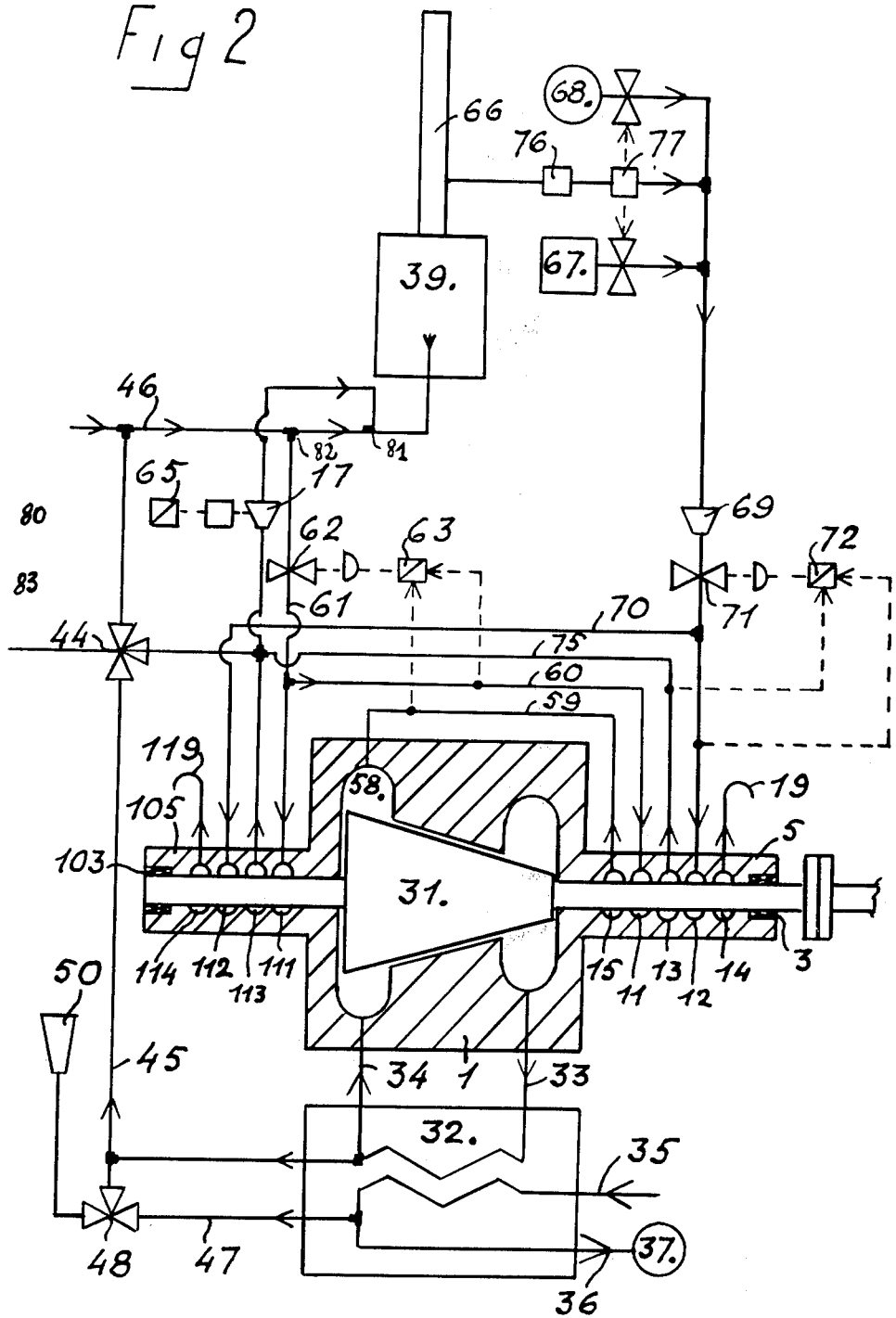
FIG. 2 is a diagrammatic view showing use of the invention in a compressor for the liquefication of natural gas.

Referring now to FIG. 2, this is a diagrammatic view showing use of the above-described sealing assembly in a compressor for the liquefication of natural gas. A natural gas liquefication unit comprises at least one compressor 31, which as shown has only one stage, for the purposes of simplification of the description and drawings, although the compressor or compressors in such a unit may have a plurality of stages. The compressor which is generally driven by a steam turbine (not shown) delivers gas under pressure to a cryogenic unit 32 by way of a delivery conduit 33 and an intake or return conduit 34. The natural gas to be liquefied is passed into the unit 32 by way of a conduit 35, issues in a liquefied condition by way of a conduit 36, and is passed to a storage means 37.

FIG. 2 shows the bearings 3 and 103 and the sealing arrangements with casings 5 and 105 and chambers 11 to 15 and 111 to 114, which have already been described above with reference to FIG. 1 The sealing arrangements use as sealing gases those which are available in the natural gas liquefication works, that is to say, gas G1 can be fuel gas which comprises approximately one-third nitrogen and two-third methane by volume, gas G2 can be purge gas from the cold end of the exchangers, which comprises approximately two-third nitrogen and one-third methane by volume, and gas G3 can be flue gas from boiler 39, which comprises by volume about 15% $CO_2$ and 85% nitrogen, with traces of oxygen. When a gas turbine is employed, the inert gas produced by post-combustion can be used. The gas G1 arrives under pressure from the cryogenic unit 32 by way of a conduit 45, and is directed by a collector 46 to the burners of the boiler 39. The gas G2 issues from the unit 32 by way of a conduit 47 and a multi-way valve 48 permits the gas G2 to be directed either into the conduit 45 and the collector 46 or to a burner torch 50 or a network of burner torches. The chamber 15 is connected either to the intake conduit 34, or, as shown, to an intake casing chamber 58 of the compresor 32 by way of a conduit 59. The chambers 11 and 111 are interconnected by a balance conduit 60 and receive gas G1 from the collector 46, at the pressure P1 by way of a conduit 61, under the control of a regulating valve 62 which is itself controlled by a regulator 63 which receives two pressure signals, one from the conduit 59 and the other from the conduit 60. The increased pressure in the chamber 11 with respect to the chamber 15 (P1 – P5 on the graph in FIG. 1), and the increased pressure in the chamber 111 with respect to the chamber 58 (P1 – BP in FIG. 1) are thus adjusted to a given value.

The chambers 13 and 113 are interconnected by a balance conduit 75; the pump 17 passes the gas G2 extracted from the chambers 13 and 113 to the collector 46. A predetermined pressure P3 is maintained by a pressure regulator 65 which acts on a valve for example in the intake of the pump 17, or acts on the speed of the pump. The extracted gas G2 can also be selectively directed as desired to a burner torch 80 by way of a multi-way valve 44.

The chambers 12 and 112 are fed with inert gas G3 from the flue 66 of the boiler 39, or by an inert gas generator 67, or by a nitrogen storage reservoir 68. A smoke purification device 76 is provided to purify the flue gases, while there is also a monitoring device 77 which monitors the degree of purification and which, if purification is not correct, causes an output of gas from the generator 67 or the reservoir 68.

A pressurising means such as a pump 69 feeds the chambers 12 and 112 with gas G3 by way of a conduit system including a balance conduit 70 which interconnects the chambers 12 and 112. A pressure regulating valve 71 maintains a given pressure P2 in the conduit 70, under the control of a pressure regulator 72 which receives two pressure signals, one from the conduit 75 and other from the conduit 70.

It is also possible to connect the regulators 63, 65 and 72 so that the pressure differences as between conduits 59, 60, 70 and 75 are kept at given relative values.

As mentioned above, although the compressor 31 has a single stage, it is possible to use a multi-stage compressor. When the compressor has a plurality of stages, the low-pressure stage remains equipped as described above with reference to FIG. 2; the high-pressure stage and possibly the medium-pressure stage or stages are each provided with two casings 5 having five chambers, the chamber 15 of such casings being interconnected and also connected to the compressor intake chamber whose operating pressure is the lowest.

Operation of the above gas barrier sealing assembly will now be described in greater detail.

Gas G1, comprising approximately one-third of nitrogen and two-third of methane, is introduced into the arrangement by way of the chambers 11 and 111. It is shown that a make-up amount of nitrogen may often be necessary at the inlet to the cryogenic unit 32, and the system takes this make-up amount into account. If an excess of nitrogen is introduced into the cryogenic unit, this excess must be eliminated in the purge gas which issues at 47 from the cryogenic unit 32. If there is a shortage of nitrogen, a make-up amount will be provided.

Inert gas G3 is introduced into the chambers 12 and 112, a part of this gas leaking into the chambers 13 and 113 respectively and being mixed with the gas G2 which is in the chambers 13 and 113; the fact that inert gas G3 is introduced into the gas G2 does not give rise to difficulty here. A part of the inert gas G3 in the chambers 12 and 112 escapes into the chambers 14 and 114 from which it is discharged by the discharge 19 and 119, which can be placed at a distance in order not to trouble the operating personnel. By means of this barrier action of inert gas, in the event of a mechanical defect in the machine, there is substantially no danger of the gas being processed, being set on fire by heat or a spark. The extracted gas G2 from the chambers 13 and 113 can be passed to the collector 46, or, by way of the valve 44 and the conduit 83, to the burner torch 80.

As the inert gas will generally contain steam and $CO_2$, it will be provided that the connection 81 to the collector 46, by way of which the gas G2 is passed into the collector 46, will be disposed downstream of the point 82 at which the gas G1 is taken off from the collector 46, a control of the direction of circulation of the gas in collector 46 being provided.

Thus, the above-described assembly provides a sealing effect by gas having a barrier action, which has substantial advantages over the previously proposed assembly in which sealing is by means of oil; there is no risk of contamination of the cooling gas circuit, that is to say, the compressors, the exchangers, their accessories and instrumentation; there is no question of consumption of an expensive barrier action liquid such as oil; there is no problem of flushing out polluted oil; the heat of the barrier action gas is recovered by returning this gas to the collector of the boiler or boilers; there is controlled introduction of nitrogen into the cooling circuit; and gas leaks to the outside air are only leaks of inert gas, so that such leakage cannot cause a fire or explosion in the case of mechanical deficiency.

I claim:

1. Apparatus for liquefying gas, operative in association with a boiler having a flue, comprising:
   a compressor including: a stationary body having a higher-pressure side and a lower-pressure side; a shaft extending through the body; and a respective bearing supporting the shaft at each side, each bearing being arranged at a spacing from the body; a sealing assembly comprising: a respective casing at each of the higher-pressure and lower-pressure sides of the machine and fixed with respect to the stationary body, each casing enclosing a portion of the shaft between the body and the respective bearing and each casing having annular chambers which are open towards the respective shaft portion, said annular chambers including a first chamber, a second chamber which is disposed between the first chamber and the respective bearing, a third chamber between the first and second chambers, a fourth chamber between the second chamber and the respective bearing, the casing at the higher-pressure side of the machine also including a fifth chamber between the first chamber and the body of the machine;
   means for introducing a barrier-action gas under pressure into the first chambers;
   means for introducing an inert gas under pressure into the second chambers, said means for introducing inert gas into the second chambers including a purification device for treating flue gas of the boiler flue; a monitoring means for monitoring the flue gas purification; an inert gas generator; a nitrogen storage reservoir; the monitoring means being coupled to said inert gas generator and to said nitorgen storage reservoir for causing an output flow from the inert gas generator and/or the nitrogen storage reservoir when a deficiency in the purified flue gas is detected, and causing said output flow to be mixed with the flue gas; a gas flow-producing means for displacing the purified flue gas into the second chambers; a valve operably coupled to the gas flow-producing means to control the output of the gas flow-producing means; and a pressure regulator coupled to sense the pressures in the second and third chambers and operably coupled to said valve to control said valve as a function of the pressures in the second and third chambers;
   means connected to the third chambers for producing therein a pressure which is lower than the pressure in the first and second chambers;
   a conduit connected to the fourth chambers and open for discharge at a postion remote from the compressor; and means coupled to the lower-pressure side of the compressor for introducing into the fifth chamber gas being handled by the compressor, from the lower-pressure side of the compressor.

2. Apparatus according to claim 1, wherein said gas flow-producing means comprises a pump.

3. Apparatus according to claim 1, wherein said means for introducing barrier-action gas into the first chambers comprises a source of barrier-action gas; a valve coupled to control the flow of barrier-action gas from said source; and a pressure regulator responsive to the pressures in said first and fifth chambers at the high-pressure side of the machine and operatively coupled to said valve to control said valve as a function of said pressures in said first and fifth chambers at the high-pressure side of the machine.

4. Apparatus according to claim 3, wherein said barrier-action gas comprises at least one of the fuel gas and the purge gas from the compressor.

5. Apparatus for liquefying gas, operative in association with a gas turbine, comprising:

a compressor including: a stationary body having a higher-pressure side and a lower-pressure side; a shaft extending through the body; and a respective bearing supporting the shaft at each side, each bearing being arranged at a spacing from the body; a sealing assembly comprising: a respective casing at each of the higher-pressure and lower-pressure sides of the machine and fixed with respect to the stationary body, each casing enclosing a portion of the shaft between the body and the respective bearing and each casing having annular chambers which are open towards the respective shaft portion, said annular chambers including a first chamber, a second chamber which is disposed between the first chamber and the respective bearing, a third chamber between the first and second chambers, a fourth chamber between the second chamber and the respective bearing, the casing at the higher-pressure side of the machine also including a fifth chamber between the first chamber and the body of the machine;

means for introducing a barrier-action gas under pressure into the first chambers;

means for introducing an inert gas under pressure into the second chambers, said means for introducing inert gas into the second chambers including a purification device for treating the discharge from said turbine; a monitoring means for monitoring the purification of the turbine discharge; an inert gas generator; a nitrogen storage reservoir; the monitoring means being coupled to said inert gas generator and to said nitrogen storage reservoir for causing an output flow from the inert gas generator and/or the nitrogen storage reservoir when a deficiency in the purification of the turbine discharge is detected, and causing said output flow to be mixed with the turbine discharge; a gas flow-producing means for displacing the purified turbine discharge into the second chambers; a valve operably coupled to the gas flow-producing means to control the output of the gas flow-producing means; and a pressure regulator coupled to sense the pressures in the second and third chambers and operably coupled to said valve to control said valve as a function of the pressures in the second and third chambers;

means connected to the third chambers for producing therein a pressure which is lower than the pressure in the first and second chambers;

a conduit connected to the fourth chambers and open for discharge at a postion remote from the compressor; and means coupled to the lower-pressure side of the compressor for introducing into the fifth chamber gas being handled by the compressor, from the lower-pressure side of the compressor.

6. Apparatus according to claim 5, wherein said gas flow-producing means comprises a pump.

7. Apparatus according to claim 5, wherein said means for introducing barrier-action gas into the first chambers comprises a source of barrier-action gas; a valve coupled to control the flow of barrier-action gas from said source; and a pressure regulator responsive to the pressures in said first and fifth chambers at the high-pressure side of the machine and operatively coupled to said valve to control said valve as a function of said pressures in said first and fifth chambers at the high-pressure side of the machine.

8. Apparatus according to claim 7, wherein said barrier-action gas comprises at least one of the fuel gas and the purge gas from the compressor.

* * * * *